United States Patent [19]

Uhlig

[11] Patent Number: 5,660,763

[45] Date of Patent: Aug. 26, 1997

[54] FIRE FIGHTING COMPOSITION AND PRODUCTS CONTAINING SAME

[75] Inventor: George F. Uhlig, Price, Utah

[73] Assignee: Thermic Labs, Inc., Carver, Mass.

[21] Appl. No.: 402,514

[22] Filed: Mar. 10, 1995

[51] Int. Cl.$^6$ .......................... C09K 21/02; B27K 3/26; B27K 3/32; D21H 17/66
[52] U.S. Cl. .................. 252/606; 252/607; 252/608; 252/378 R; 252/4; 252/5; 252/7
[58] Field of Search .......................... 252/4, 5, 7, 2, 252/603, 606, 607, 608, 378 R

[56] References Cited

U.S. PATENT DOCUMENTS

| | | | |
|---|---|---|---|
| 1,804,417 | 5/1931 | Herting | 162/159 |
| 3,238,129 | 3/1966 | Veltman | 252/7 |
| 3,762,942 | 10/1973 | Putnam et al. | 106/18.15 |
| 4,182,681 | 1/1980 | Gumbert | 252/607 |
| 4,184,969 | 1/1980 | Bhat | 252/607 |
| 4,212,675 | 7/1980 | Robinson | 106/18.15 |
| 4,448,841 | 5/1984 | Glass et al. | 252/608 |
| 4,595,414 | 6/1986 | Shutt | 106/18.16 |
| 4,756,839 | 7/1988 | Curzon et al. | 252/2 |
| 4,842,772 | 6/1989 | Withiam | 252/601 |
| 4,888,136 | 12/1989 | Chellapa et al. | 252/607 |
| 4,950,410 | 8/1990 | Pennartz | 252/7 |
| 4,961,865 | 10/1990 | Pennartz | 252/7 |
| 5,091,097 | 2/1992 | Pennartz | 252/7 |
| 5,397,509 | 3/1995 | Kostrzecha | 252/607 |

*Primary Examiner*—Joseph D. Anthony

[57] ABSTRACT

Fire fighting compositions are disclosed which are distinguished from the prior art by the presence of alum as a component of the composition, by the use of a combination of salts in concentrations which will form a eutectic mixture when heated, and by the inclusion of a salt of an organic acid which will generate carbon dioxide by the heat of a fire. Additional inorganic salts may be added to increase the effectiveness of the composition. These fire fighting compositions may be permeated into a cellulosic material to provide fire retardant articles of manufacture.

10 Claims, No Drawings

FIRE FIGHTING COMPOSITION AND PRODUCTS CONTAINING SAME

FIELD OF THE INVENTION

This invention relates to novel fire fighting compositions and to products and articles containing such fire fighting compositions. The fire fighting compositions are particularly useful when applied to cellulosic materials such as wood and cardboard.

BACKGROUND OF THE INVENTION

Many compositions have been developed with the objective of fighting fires. Some of these compositions have been designed to extinguish existing fires by application after the fire has started. Other compositions are designed to be applied to a material or product as a step in the manufacturing process, with the objective of inhibiting the start of a fire or of retarding the spread of a subsequently started fire.

With the exception of certain types of fires, principally electrical fires and fires involving metals, water is a principal component of many fire fighting compositions and acts to lower the temperature of the burning material below that at which it will support further combustion. Formation of a layer of water also reduces the amount of oxygen available to support combustion. Water also serves as a vehicle or carrier for other ingredients added to enhance the fire extinguishing effect of the water. Some such added ingredients act to modify the surface, or to form a surface, which will not support combustion or re-ignition after a fire has apparently been extinguished. Other ingredients may be added with the objective of generating a gas when heated by the fire, the gas effectively diluting the oxygen level below the level required for combustion to continue. Other ingredients may be added with the objective of reacting with the combustible material to form a modified material which is less combustible under the existing conditions.

As examples of disclosures of fire fighting compositions, mention may be made of Pennartz U.S. Pat. Nos. 4,950,410 issued Aug. 21, 1990, 4,961,865 issued Oct. 9, 1990, and 5,091,097 issued Feb. 25, 1992, and of Curson and Mikulec U.S. Pat. No. 4,756,839 issued Jul. 12, 1988.

A desirable fire extinguishing composition should not only be effective for the intended use but the combination of ingredients should be synergistic, or at least complement each other, in their fire fighting activity, be easy to apply, be cost effective for the intended use, and be environmentally friendly. The present invention provides novel fire fighting compositions which are believed to satisfy these objectives, particularly when used with cellulosic materials such as wood, paper and cardboard packaging materials.

SUMMARY OF THE INVENTION

The novel fire fighting compositions of this invention may be distinguished from the prior art by the presence of alum as a component of the composition, by the use of a combination of salts in concentrations which will form an eutectic mixture when heated, and by the inclusion of a salt of an organic acid which will generate carbon dioxide by the heat of a fire. To the best of the inventor's knowledge, such fire fighting compositions have not been disclosed in the prior art.

DETAILED DESCRIPTION OF THE INVENTION

The novel fire fighting compositions of this invention comprise a mixture of (a) aluminum sulfate, (b) sodium, potassium or ammonium sulfate, (c) sodium, potassium or ammonium bromide, (d) sodium, potassium or ammonium chloride, and (e) a sodium, potassium or ammonium salt of a mono-, di- or tri-protic aliphatic organic acid of 1 to 6 carbons. Ingredients (a), (b), (c) and (d) are present in concentrations, respectively, which will form an eutectic mixture with one another when heated. The organic acid salt generates carbon dioxide in situ when heated by fire, and the carbon dioxide not only acts to extinguish or inhibit combustion but also causes the char formed by burning to form a porous frit. This porous frit then is able to absorb and hold the eutectic mixture of salts in place to further inhibit combustion. As the temperature of the fire increases, the molten salt mixture vaporizes or ablates; since the ablative process is an endothermic process it absorbs heat which in turn cools the surface of the material, thus further inhibiting combustion.

The use of aluminum sulfate in combination with sodium, potassium or ammonium sulfate produces the mixed alum in situ. The two sulfates preferably are present in a 1:1 molar ratio; this ratio gives a mixed alum which increases the solubility in water of the individual salts. This improved solubility permits the use of either hydrated or anhydrous salts of any of the components, as the anhydrous salts dissolve equally well in the presence of such a mixed alum.

The preferred embodiments also include magnesium sulfate or chloride. The addition of magnesium chloride or sulfate has a synergistic effect by lowering the temperature at which the desired eutectic mixture is formed.

It has been found that the addition of a surfactant is advantageous in facilitating penetration of the fire fighting composition into cellulosic materials. A preferred surfactant is a nonionic surfactant, such as a nonylphenol ethoxylate commercially available from Rhone-Poulenc Inc., Cranbury, N.J. under the trademark Igepal. Particularly preferred is the nonylphenol ethoxylate having 9 moles of ethylene oxide and available from Rhone-Poulenc as Igepal CO-630 as a liquid (100%). Other synthetic surfactants also may be used.

In the preferred embodiments of this invention, the fire fighting composition includes a small concentration of sodium borate (borax). This concentration is lower than the typical concentration of sodium borate in conventional fire fighting compositions, thus reducing the possible toxic effects of including borax. The preferred embodiments also include magnesium sulfate or magnesium chloride.

As noted above, the organic acid salt is a sodium, potassium or ammonium salt of a mono-, di-, or triprotic organic acid, e.g., acetic, succinic or citric. The pH of the fire fighting composition is between 3 and 8.5, and may be adjusted by appropriate selection of the acid and the salt thereof, for example by using the mono-, di- or tri-potassium or other salt of a triprotic acid such as succinic acid. Such pH adjustment is particularly useful when the fire fighting composition is applied as an aqueous solution to a cellulosic material during its manufacture or processing to avoid adverse effects upon the cellulosic material or upon the equipment used in this treatment.

The fire fighting compositions of this invention may be formulated by mixing the ingredients dry or by adding them to water with mixing and heating. One of the advantages of the novel fire fighting compositions of this invention is that they can be combined in the dry or non-aqueous state, and the resulting mixture can be shipped to the point of use where it is dissolved in water as needed, thus saving the cost of shipping water and the cost of larger shipping containers.

The novel fire fighting compositions of this invention are particularly effective with cellulosic materials, such as wood, paper and cardboard. The fire fighting composition may be applied to the cellulosic material as an aqueous solution at an appropriate step during the manufacture or processing of the cellulosic material, followed by drying after a suitable time period to permit the solution to penetrate the cellulosic material. If the cellulosic material is subsequently ignited, the fire fighting composition is activated by the heat and as so used has been found to inhibit continued combustion. Alternatively, an aqueous solution of the fire fighting composition may be applied to burning cellulosic material in a conventional manner to extinguish or suppress continued combustion.

Effective concentration ranges and preferred concentrations of the preferred ingredients of the fire fighting compositions of this invention are set forth in the following Tables I and II, respectively:

|  | Table I Effective | Table II Preferred |
| --- | --- | --- |
| $Al_2(SO_4)_3\ 12H_2O$ | 1.25–20 w/v % | 5 w/v % |
| $Na_2SO_4\ 10H_2O$ | 1.5–5 w/v % | 6 w/v % |
| NaBr | 0.25–50 w/v % | 1 w/v % |
| $NaOAc\ 3H_2O$ | 0.25–20 w/v % | 1 w/v % |
| $MgSO_4\ 7H_2O$ | 1.25–50 w/v % | 5 w/v % |
| $Na_2B_4O_7\ 10H_2O$ | 0.05–2 w/v % | 0.2 w/v % |
| KCl | 1.25–28 w/v % | 5 w/v % |
| Igepal CO-630 | 0.025–20 v/v % | 0.1 v/v % |

"w/v" refers to "weight/volume" and "v/v" to "volume/volume", with the percent concentrations being in grams per 100 cc. of water and cc. per 100 cc. of water, respectively.

In the event the anhydrous form is used in place of the hydrated salt, the concentration should be adjusted to account for the water of hydration.

Potassium sulfate may be substituted for sodium sulfate, an effective range being 0.66 to 10 w/v %.

The effective range for potassium or ammonium bromide is the same as that for sodium bromide.

Magnesium chloride hexahydrate may be substituted for magnesium sulfate, using the same effective range.

Potassium chloride may be replaced by sodium chloride using the same effective range, or it may be replaced by ammonium chloride using an effective range of 1.25 to 28 w/v %.

A test fire fighting composition was prepared having the preferred components and concentrations as set forth in Table II above by dissolving the recited components, with stirring, in a liter of water heated to about 60 degrees Centigrade. This Test Composition had a pH of 4.0 and was used in the following tests in a laboratory environment to determine the Flame Spread Index (FSI) and the Smoke Development Index (SDI).

TEST NO. 1

Six 6 inch by 1½ inch by 1½ inch pieces of oak were placed in a 200 degree Fahrenheit oven for 30 minutes. The samples were then placed in a liter of the Test Composition for 3 hours, with the samples being mechanically restrained to insure that they remained under the surface of the liquid. The samples were then placed in a 150 degree Fahrenheit oven for 8 hours; the approximate moisture content of the oak after drying was 6.4%.

Each sample was exposed to a 2500 degree Fahrenheit flame for a period of 2 minutes. When the flame was removed the burning or charring of the oak stopped. The fire spread was confined to the area exposed to the flame. The surface of the exposed area cooled down rapidly to a temperature that would not produce combustion or re-ignition. The charring effect of the surface of the oak was approximately ⅛ to 3/16 inch in depth.

TEST NO. 2

In this test, the same conditions existed as in Test No. 1, except that the oak samples were replaced with six pieces of pine that measured 1½ inch by 3½ inch by 1½ inch. When the flame was removed the burning or charring stopped, and the fire spread was limited to the area in contact with the flame. The charring depth on the surface of the pine samples varied from ⅛ to ⅜ inch. The surface of the exposed area cooled down rapidly to a temperature that would not produce combustion or re-ignition.

TEST NO. 3

In this test, six pieces of single wall and six pieces of double wall cardboard, each 5 inches by 5 inches, were placed in a liter of the Test Composition for 5 minutes, the samples being mechanically restrained to insure that they stayed below the surface of the liquid. The samples were then dried in a 150 degree Fahrenheit oven for six hours.

Each sample was exposed to a 2,500 degree Fahrenheit flame for 10 to 15 seconds. Once the flame was removed the burning or charring of the cardboard stopped. The fire spread was confined to the area exposed to the flame. The exposed area cooled down rapidly to a temperature that would not produce combustion or re-ignite. The charring was visible on both sides of the cardboard, but no hole was formed.

TEST NO. 4

Test No. 3 was repeated, except that 1 liter of the Test Composition was diluted with water to approximately 66% of its original concentration. Substantially the same results were obtained as in Test No. 3. No combustion occurred after removing the flame, and no additional charring occurred.

TEST NO. 5

In this test, the same conditions were applied as in Test No. 3, except that the pine samples were replaced with 7 inch by 7 inch samples of cotton cloth. The cloth samples were submerged in a liter of the Test Composition for a period of 30 seconds so that they were saturated. The cloth samples were then dried in a 150 degree Fahrenheit oven for 2 hours. A 2,500 degree Fahrenheit flame was applied to the center of the sample. Once the flame was removed the fire spread was confined to the area that was exposed to the flame. The exposed area cooled down rapidly to a temperature that would not produce combustion or re-ignition.

TEST NO. 6

A liter of the Test Composition was added to 2 gallons of water and placed in a container. A five foot high Douglas Fir tree was placed into the container and allowed to absorb the composition through the trunk of the tree and into the needles. At 24 hour intervals over the following 10 days, branches approximately 6 inches long were subjected to a 2,500 degree Fahrenheit flame for 20 seconds which burned or charred the needles directly in the path of the flame. Once the flame was removed the burning or charring stopped. The exposed area cooled down rapidly to a temperature that would not allow re-ignition or combustion of the remaining unburned or uncharred needles.

TEST NO. 7

The Test Composition was used to coat six branches of a Douglas Fir tree by dipping them into the liquid. The branches were dried at room temperature (74 degrees Fahrenheit) for 24 hours. When a 2,500 degree Fahrenheit flame was applied to the branches for 20 seconds, the time burned or charred the needles directly in the path of the flame. When the flame was removed the burning or charring stopped. The exposed area cooled down rapidly to a temperature that would not allow re-ignition or combustion of the unburned or uncharred needles.

TEST NO. 8

The Test Composition was used to coat six pieces of 8½ inch by 11 inch bond paper by mechanically holding the samples under the surface of the liquid for 30 minutes. The samples were then dried for 2 hours in a 150 degree Fahrenheit oven. Each sample was exposed to a 2,500 degree Fahrenheit flame for 15 seconds. When the flame was removed the burning or charring stopped. The fire spread was confined to the area that was exposed to the flame, that area being charred through. The surface of the exposed area cooled down rapidly to a temperature that would not produce combustion or re-ignition.

TEST NO. 9

Test No. 1 was repeated using six pieces of pressboard 4 inches by 3½ inches by ⅝ inch in place of the oak samples. Charring of the surface was limited to a depth of ⅛ to ⅜ inch, and the fire spread was limited to the area in contact with the flame. The surface of the area exposed to the flame cooled rapidly to a temperature that would not support combustion or re-ignition. No adverse effect upon the glue used in the pressboard was observed as a result of the treatment with the Test Composition.

It will be recognized that the soaking of the cellulosic material in the aqueous fire fighting composition results in the salts therein permeating into the cellulosic material. The drying treatment removes the aqueous carrier, leaving a dispersion of the salts in the cellulosic material. This process is effective to provide cellulosic articles of manufacture having fire retardant properties. As demonstrated in the above tests, should the cellulosic material subsequently be ignited, the heat of the fire is effective to melt the salts and activate them to retard further combustion and re-ignition.

While the invention has been described in some detail and a preferred embodiment has been described and illustrated, it is to be understood that various changes may be made therein without departing from the spirit and scope of the invention, and that the invention is to be limited only by the scope of the following claims.

What is claimed is:

1. A fire fighting composition comprising a mixture of (a) aluminum sulfate, (b) sodium, potassium or ammonium sulfate, (c) sodium, potassium or ammonium bromide, and (d) sodium, potassium or ammonium chloride, said components (a), (b), (c) (d) being present in concentrations, respectively, which will form an eutectic mixture with one another when heated.

2. A fire fighting composition as defined in claim 1 wherein said composition is aqueous.

3. A fire fighting composition as defined in claim 1 wherein said aluminum sulfate (component (a)) and said sodium, potassium or ammonium sulfate (component (b)) are present in a concentration effective to form a mixed alum.

4. A fire fighting composition as defined in claim 3 wherein said sodium, potassium or ammonium sulfate is present in a 1:1 molar ratio with said aluminum sulfate.

5. A fire fighting composition as defined in claim 1, wherein said composition includes a sodium, potassium or ammonium salt of a mono-, di-, or tri-protic organic acid of 1 to 6 carbons.

6. A fire fighting composition as defined in claim 5, wherein said composition has a pH of 3 to 8.5.

7. A fire fighting composition as defined in claim 5, wherein said organic acid salt is sodium acetate.

8. A fire fighting composition as defined in claim 5, wherein said composition includes magnesium sulfate or chloride, sodium borate and a surfactant.

9. An aqueous fire fighting composition comprising:

1.25–20 w/v % $Al_2(SO_4)_3$ 12 $H_2O$ 1.5–5 w/v % $Na_2SO_4$ 10 $H_2O$ 0.25–50 w/v % NaBr 0.25–20 w/v % Na acetate 3 $H_2O$ 1.25–50 w/v % $MgSO_4$ 7 $H_2O$ 0.05–2 w/v % $Na_2B_4O_7$ 10 $H_2O$ 1.25–28 w/v % KCl 0.025–20 v/v % nonylphenol ethoxylate having 9 moles ethylene oxide wherein "w/v" refers to "weight/volume" and "v/v" to "volume/volume", with the percent concentrations being in grams per 100 cc. of water and cc. per 100 cc. of water, respectively, said aluminum sulfate, sodium sulfate, sodium bromide and potassium chloride being present in concentrations, respectively, which will form an eutectic mixture with one another when heated.

10. An aqueous fire fighting composition comprising:

5 w/v % $Al_2(SO_4)_3$ 12 $H_2O$ 6 w/v % $Na_2SO_4$ 10 $H_2O$ 1 w/v % NaBr 1 w/v % Na acetate 5 w/v % $MgSO_4$ 7 $H_2O$ 0.2 w/v % $Na_2B_4O_7$ 10 $H_2O$ 5 w/v % KCl 0.1 v/v % nonylphenol ethoxylate having 9 moles ethylene oxide wherein "w/v" refers to "weight/volume" and "v/v" refers to "volume/volume", with the percent concentrations being in grams per 100 cc. of water and cc. per 100 cc. water, respectively.

* * * * *